United States Patent
Hong

(10) Patent No.: US 11,937,325 B2
(45) Date of Patent: Mar. 19, 2024

(54) METHOD AND DEVICE FOR TRANSMITTING FLIGHT INFORMATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 503 days.

(21) Appl. No.: 17/266,441

(22) PCT Filed: Aug. 8, 2018

(86) PCT No.: PCT/CN2018/099300
§ 371 (c)(1),
(2) Date: Feb. 5, 2021

(87) PCT Pub. No.: WO2020/029104
PCT Pub. Date: Feb. 13, 2020

(65) Prior Publication Data
US 2021/0298113 A1    Sep. 23, 2021

(51) Int. Cl.
*H04W 76/27* (2018.01)
*G08G 5/00* (2006.01)
*H04B 7/185* (2006.01)

(52) U.S. Cl.
CPC ............ *H04W 76/27* (2018.02); *G08G 5/003* (2013.01); *H04B 7/18504* (2013.01)

(58) Field of Classification Search
None
See application file for complete search history.

(56) References Cited

U.S. PATENT DOCUMENTS

| 2020/0015074 A1* | 1/2020 | Kim | H04W 12/108 |
| 2021/0201685 A1* | 7/2021 | Han | G08G 5/0026 |

FOREIGN PATENT DOCUMENTS

| CN | 107610533 A | 1/2018 |
| CN | 107992066 A | 5/2018 |
| CN | 108064360 A | 5/2018 |
| WO | WO 2018036609 A1 | 3/2018 |
| WO | WO 2018061502 A1 | 4/2018 |

OTHER PUBLICATIONS

International Preliminary Report on Patentability in Application No. PCT/CN2018/099300, dated Apr. 28, 2019.
Partial European Search Report in Application No. 18929062.0, dated Jun. 4, 2021.
Examination Report for Indian application No. 202147009401, dated Jan. 27, 2022.

* cited by examiner

*Primary Examiner* — Anh Ngoc M Nguyen
(74) *Attorney, Agent, or Firm* — Finnegan, Henderson, Farabow, Garrett & Dunner, L.L.P

(57) ABSTRACT

A method for transmitting flight information includes: in a radio resource control (RRC) processing process, generating RRC signaling, the RRC signaling carrying the number of flight path points of an unmanned aerial vehicle; and transmitting the RRC signaling to a base station.

12 Claims, 10 Drawing Sheets

METHOD AND DEVICE FOR TRANSMITTING FLIGHT INFORMATION

CROSS REFERENCE TO RELATED APPLICATIONS

This application is a national phase application based on International Application No. PCT/CN2018/099300, filed Aug. 8, 2018, the content of which is incorporated herein by reference.

TECHNICAL FIELD

The disclosure relates to a field of communication technologies, and more particularly to a method and an apparatus for transmitting flight information.

BACKGROUND

With the development of science and technology, an unmanned aerial vehicle has been gradually used from military to civilian. The unmanned aerial vehicle is no longer a short-distance remote control aircraft, but may fly a long distance based on a preset route. According to industry insiders, a mobile cellular network may provide a service for the unmanned aerial vehicle. However, there is no effective solution for what kind of service to provide and how to provide the service. A premise of providing the service is that a network side may obtain flight information, but there is no effective solution for how to obtain the flight information.

SUMMARY

Embodiments of the disclosure provide a method and an apparatus for transmitting flight information. The technical solution is as follows.

According to a first aspect of embodiments of the disclosure, there is provided a method for transmitting flight information. The method includes: generating a radio resource control (RRC) signaling in an RRC processing procedure, the RRC signaling carrying the number of flight path points of the unmanned aerial vehicle; and sending the RRC signaling to a base station.

The technical solution provided by embodiments of the disclosure may include following advantageous effects. With this embodiment, the number of flight path points of the unmanned aerial vehicle is transmitted by utilizing the RRC signaling, and a feasible solution is provided for transmitting the number of flight path points of the unmanned aerial vehicle.

In an embodiment, the RRC processing procedure includes at least one of: an RRC connection reconfiguration procedure, an RRC connection reestablishment procedure, an RRC connection resume procedure and an RRC connection setup procedure.

The technical solution provided by embodiments of the disclosure may include following advantageous effects. With this embodiment, the number of flight path points of the unmanned aerial vehicle may be transmitted in multiple scenes, and it is implemented that the number of flight path points of the unmanned aerial vehicle is reported in time, an additional uplink message is not added, and there is a good compatibility for an existing mobile communication system.

In an embodiment, in the RRC connection reconfiguration procedure, the RRC signaling includes an RRC connection reconfiguration completion signaling. In the RRC connection reestablishment procedure, the RRC signaling includes an RRC connection reestablishment completion signaling. In the RRC connection resume procedure, the RRC signaling includes an RRC connection resume completion signaling. In the RRC connection setup procedure, the RRC signaling includes an RRC connection setup completion signaling.

The technical solution provided by embodiments of the disclosure may include following advantageous effects. With this embodiment, transmission for the number of flight path points of the unmanned aerial vehicle may be implemented by utilizing various RRC signalings.

In an embodiment, the method also includes: receiving a user equipment information request signaling sent by the base station, the user equipment information request signaling carrying the maximum number of flight path points to be reported; and sending a user equipment information response signaling to the base station, the user equipment information response signaling carrying information of flight path points of the unmanned aerial vehicle that are not more than the maximum number of flight path points.

The technical solution provided by embodiments of the disclosure may include following advantageous effects. With this embodiment, a feasible solution for transmitting the information of flight path points of the unmanned aerial vehicle is provided, and the user equipment information request signaling and the user equipment information response signaling are multiplexed.

In an embodiment, an information unit of a flight path information request in the user equipment information request signaling carries the maximum number of flight path points; and an information unit of a flight path information report in the user equipment information response signaling carries the information of flight path points of the unmanned aerial vehicle.

The technical solution provided by embodiments of the disclosure may include following advantageous effects. With this embodiment, the user equipment information request signaling and the user equipment information response signaling are improved to meet a requirement of transmitting the flight information.

According to a second aspect of embodiments of the disclosure, there is provided a method for transmitting flight information. The method is applied to a base station side. The method includes: receiving a radio resource control (RRC) signaling in an RRC processing procedure, the RRC signaling carrying the number of flight path points of an unmanned aerial vehicle; and obtaining and storing the number of flight path points of the unmanned aerial vehicle by parsing the RRC signaling.

In an embodiment, the RRC processing procedure includes at least one of: an RRC connection reconfiguration procedure, an RRC connection reestablishment procedure, an RRC connection resume procedure and an RRC connection setup procedure.

In an embodiment, in the RRC connection reconfiguration procedure, the RRC signaling includes an RRC connection reconfiguration completion signaling. In the RRC connection reestablishment procedure, the RRC signaling includes an RRC connection reestablishment completion signaling. In the RRC connection resume procedure, the RRC signaling includes an RRC connection resume completion signaling. In the RRC connection setup procedure, the RRC signaling includes an RRC connection setup completion signaling.

In an embodiment, the method also includes: sending a user equipment information request signaling to the unmanned aerial vehicle, the user equipment information request signaling carrying the maximum number of flight path points to be reported; and receiving a user equipment information response signaling sent by the unmanned aerial vehicle, the user equipment information response signaling carrying information of flight path points of the unmanned aerial vehicle that are not more than the maximum number of flight path points.

In an embodiment, an information unit of a flight path information request in the user equipment information request signaling carries the maximum number of flight path points; and an information unit of a flight path information report in the user equipment information response signaling carries the information of flight path points of the unmanned aerial vehicle.

According to a third aspect of embodiments of the disclosure, a method for transmitting flight information. The method is applied to a base station side. The method includes: sending a user equipment information request signaling to an unmanned aerial vehicle, the user equipment information request signaling carrying the maximum number of flight path points to be reported; and receiving a user equipment information response signaling sent by the unmanned aerial vehicle, the user equipment information response signaling carrying information of flight path points of the unmanned aerial vehicle that are not more than the maximum number of flight path points.

According to a fourth aspect of embodiments of the disclosure, there is provided a method for transmitting flight information. The method is applied to an unmanned aerial vehicle side. The method includes: receiving a user equipment information request signaling sent by a base station, the user equipment information request signaling carrying the maximum number of flight path points to be reported; and sending a user equipment information response signaling to the base station, the user equipment information response signaling carrying information of flight path points of the unmanned aerial vehicle that are not more than the maximum number of flight path points.

According to a fifth aspect of embodiments of the disclosure, there is provided a device for transmitting flight information. The device includes: a processor and a memory. The memory is configured to store instructions executable by the processor. The processor is configured to: generate a radio resource control (RRC) signaling in an RRC processing procedure, the RRC signaling carrying the number of flight path points of an unmanned aerial vehicle; and send the RRC signaling to a base station.

According to a sixth aspect of embodiments of the disclosure, there is provided a device for transmitting flight information. The device includes: a processor and a memory. The memory is configured to store instructions executable by the processor. The processor is configured to: receive a radio resource control (RRC) signaling in an RRC processing procedure, the RRC signaling carrying the number of flight path points of an unmanned aerial vehicle; and obtain and store the number of flight path points of the unmanned aerial vehicle by parsing the RRC signaling.

According to a seventh aspect of embodiments of the disclosure, there is provided a device for transmitting flight information. The device includes: a processor and a memory. The memory is configured to store instructions executable by the processor. The processor is configured to: send a user equipment information request signaling to an unmanned aerial vehicle, the user equipment information request signaling carrying the maximum number of flight path points to be reported; and receive a user equipment information response signaling sent by the unmanned aerial vehicle, the user equipment information response signaling carrying information of flight path points of the unmanned aerial vehicle that are not more than the maximum number of flight path points.

According to an eighth aspect of embodiments of the disclosure, there is provided a device for transmitting flight information. The device includes: a device for transmitting flight information. The device includes a processor and a memory. The memory is configured to store instructions executable by the processor. The processor is configured to: receive a user equipment information request signaling sent by a base station, the user equipment information request signaling carrying the maximum number of flight path points to be reported; and send a user equipment information response signaling to the base station, the user equipment information response signaling carrying information of flight path points of an unmanned aerial vehicle that are not more than the maximum number of flight path points.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the disclosure. Instead, they are merely examples of apparatuses and methods consistent with some aspects of the disclosure as described in the appended claims.

In the related art, according to industry insiders, a mobile cellular network may provide a service for an unmanned aerial vehicle. However, there is no effective solution for what kind of service to provide and how to provide the service.

The inventor of the disclosure finds that a basis of providing the service is that a base station needs to know flight path information of the unmanned aerial vehicle, which facilitates the base station to better plan a home cell for the unmanned aerial vehicle based on a flight path and to provide a reference for selecting a target cell. The base station may also provide other service for the unmanned aerial vehicle based on the flight path information, which is not listed here. Therefore, how to obtain the flight path information of the unmanned aerial vehicle is a problem to be solved.

To solve the above problems, in this embodiment, the number of flight path points of the unmanned aerial vehicle is transmitted in an RRC (radio resource control) procedure, and the information of flight path points of the unmanned aerial vehicle is transmitted in a user equipment (UE) information transmission procedure, to facilitate the base station to obtain a flight path of the unmanned aerial vehicle.

Figure 1:
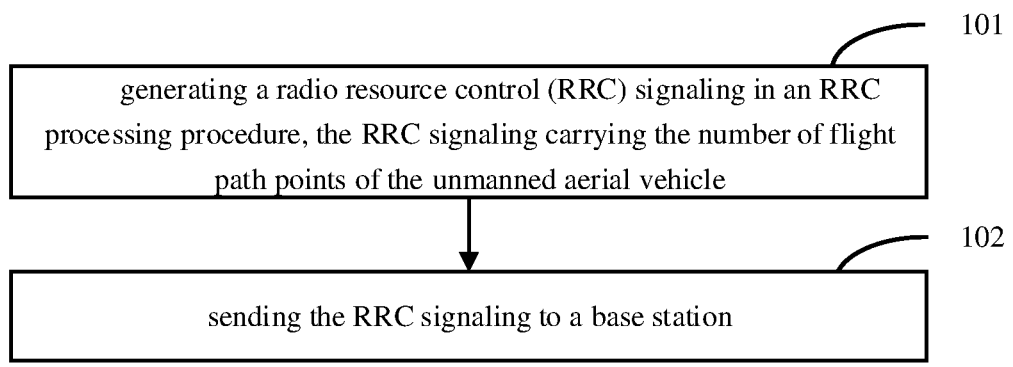
FIG. 1 is a flowchart illustrating a method for transmitting flight information according to an exemplary embodiment.

FIG. 1 is a flowchart illustrating a method for transmitting flight information according to an exemplary embodiment. The method for transmitting the flight information is applicable to a mobile device such as an unmanned aerial vehicle. As illustrated in FIG. 1, the method may include steps 101-102.

At step 101, a radio resource control (RRC) signaling may be generated in an RRC processing procedure. The RRC signaling may carry the number of flight path points of the unmanned aerial vehicle.

At step 102, the RRC signaling may be sent to a base station.

In some embodiments, the unmanned aerial vehicle may report the number of flight path points of the unmanned aerial vehicle to the base station through the RRC signaling. Therefore, a feasible solution may be provided in embodiments of the disclosure to implement the transmission of the flight information between user equipment and the base station.

The unmanned aerial vehicle may have flight paths stored in advance. The flight path may be composed of multiple flight path points. The reported number of flight path points of the unmanned aerial vehicle refers to the number of flight path points that the unmanned aerial vehicle will pass through in the future. A number threshold may be preset. The reported number of flight path points of the unmanned aerial vehicle has to be not more than the number threshold. Alternatively, a time threshold may be preset, and the unmanned aerial vehicle may determine the number of flight path points to be passed based on a current flight speed and the time threshold. There are various strategies for determining the number of flight path points of the unmanned aerial vehicle that needs to be reported, which are all applicable to embodiments of the disclosure.

In some embodiments, the RRC processing procedure may include at least one of: an RRC connection reconfiguration procedure, an RRC connection reestablishment procedure, an RRC connection resume procedure and an RRC connection setup procedure.

In some embodiments, the transmission of the number of flight path points of the unmanned aerial vehicle may be implemented in multiple RRC-related procedures, such that the number of flight path points of the unmanned aerial vehicle may be reported to the base station in time. In addition, existing RRC procedures may be reused without adding an additional uplink message or allocating resources by the base station for the additional uplink message, thereby simplifying a report procedure and providing a good compatibility with an existing mobile communication system.

In some embodiments, in the RRC connection reconfiguration procedure, the RRC signaling may include an RRC connection reconfiguration completion signaling (such as RRCConnectionReconfigurationComplete).

In the RRC connection reconstruction procedure, the RRC signaling may include an RRC connection reestablishment completion signaling (such as RRCConnectReestablishmentComplete).

In the RRC connection resume procedure, the RRC signaling may include an RRC connection resume completion signaling (such as RRCConnectionResumeComplete).

In the RRC connection setup procedure, the RRC signaling may include an RRC connection setup completion signaling (such as RRCConnectionSetupComplete).

More than one pieces of RRC signaling may be used in each RRC processing procedure, which may be used to transmit the number of flight path points of the unmanned aerial vehicle. In some embodiments, a last piece of signaling of each RRC processing procedure may be used. That is, completion signaling of each RRC processing procedure may be used, thereby reducing an impact on each RRC processing procedure, and providing a good compatibility.

In some embodiments, the method may further include steps A1 and A2.

At step A1, a user equipment information request signaling sent by the base station may be received. The user equipment information request signaling may carry a maximum number of flight path points to be reported.

At step A2, a user equipment information response signaling may be sent to the base station. The user equipment information response signaling may carry information of flight path points of the unmanned aerial vehicle that are not more than the maximum number of flight path points to be reported.

In some embodiments, the unmanned aerial vehicle may receive the user equipment information request signaling sent by the base station at any time. The RRC processing procedure and the procedure of receiving the user equipment information request signaling sent from the base station are not necessarily linked to each other. The steps 101 and 102 may be performed multiple times, and then the steps A1 and A2 may be performed once. The steps 101 and 102 may be performed once, and then the steps A1 and A2 may be performed multiple times.

The unmanned aerial vehicle may report the number of flight path points of the unmanned aerial vehicle first. The base station may allocate uplink resources for reporting, by the unmanned aerial vehicle, the information of flight path points of the unmanned aerial vehicle based on the received number of flight path points of the unmanned aerial vehicle. The base station may notify the unmanned aerial vehicle of the maximum number of flight path points to be reported through the user equipment information request signaling. The maximum number of flight path points to be reported may indicate the maximum amount of uplink resources allocated by the base station to the unmanned aerial vehicle for reporting the information of flight path points of the unmanned aerial vehicle. The user equipment information request signaling may further include indication information of the maximum amount of uplink resources for reporting the information of flight path points of the unmanned aerial vehicle. The maximum number of flight path points to be reported may not be consistent with the received number of flight path points of the unmanned aerial vehicle. That is, the maximum number of flight path points to be reported may be greater or lower than the received number of flight path points of the unmanned aerial vehicle.

The unmanned aerial vehicle may report the information of flight path points of the unmanned aerial vehicle based on the received maximum number of flight path points to be reported. The information of flight path points of the unmanned aerial vehicle is information of flight path points that the unmanned aerial vehicle will pass through. The number of flight path points contained in the information of flight path points of the unmanned aerial vehicle may be not greater than the received maximum number of flight path points to be reported.

In some embodiments, an information unit of a flight path information request (FlightPathInformationReq) in the user equipment information request (UEInformationRequest) signaling may carry the maximum number of flight path points. An information unit of a flight path information report (FlightPathInformationReport) in the user equipment information response (UEInformationResponse) signaling may carry the information of flight path points of the unmanned aerial vehicle.

In some embodiments, a feasible solution may be provided by using the information unit of the flight path information request in the user equipment information request signaling to carry the maximum number of flight path points, and using the information unit of the flight path information report in the user equipment information response signaling to carry the information of flight path points of the unmanned aerial vehicle.

Implementations may be described in detail below through embodiments.

Figure 2:
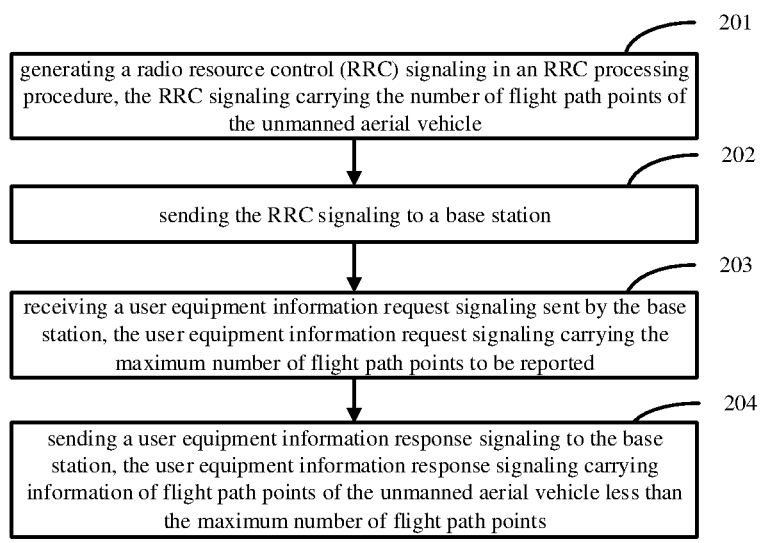
FIG. 2 is a flowchart illustrating a method for transmitting flight information according to an exemplary embodiment.

FIG. 2 is a flowchart illustrating a method for transmitting flight information according to an exemplary embodiment. The method for transmitting the flight information is applicable to a mobile device such as an unmanned aerial vehicle. As illustrated in FIG. 2, the method may include steps 201-204.

At step 201, an RRC signaling may be generated in an RRC processing procedure. The RRC signaling may carry the number of flight path points of the unmanned aerial vehicle.

At step 202, the RRC signaling may be sent to a base station.

At step 203, a user equipment information request signaling sent by the base station may be received. The user equipment information request signaling may carry the maximum number of flight path points to be reported.

At step 204, a user equipment information response signaling may be sent to the base station. The user equipment information response signaling may carry information of flight path points of the unmanned aerial vehicle that are not more than the maximum number of flight path points to be reported.

Descriptions are made above to the implementations of the unmanned aerial vehicle. Correspondingly, the base station is also improved. Descriptions will be made below to the implementations of the base station.

Figure 3:
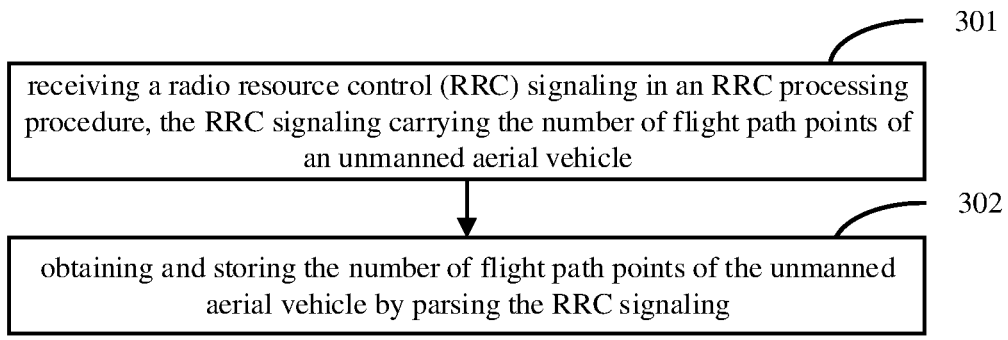
FIG. 3 is a flowchart illustrating a method for transmitting flight information according to an exemplary embodiment.

FIG. 3 is a flowchart illustrating a method for transmitting flight information according to an exemplary embodiment. The method for transmitting the flight information is applicable to access network equipment, such as a base station. As illustrated in FIG. 3, the method may include steps 301-302.

At step 301, an RRC signaling may be received in an RRC processing procedure. The RRC signaling may carry the number of flight path points of an unmanned aerial vehicle.

At step 302, the number of flight path points of the unmanned aerial vehicle may be obtained and stored by parsing the RRC signaling.

In some embodiments, the base station may obtain the number of flight path points of the unmanned aerial vehicle in the RRC processing procedure, and store and update the number of flight path points. Embodiments of the disclosure provide a way and a feasible solution for the base station to obtain the number of flight path points of the unmanned aerial vehicle.

In some embodiments, the RRC processing procedure may include at least one of: an RRC connection reconfiguration procedure, an RRC connection reestablishment procedure, an RRC connection resume procedure and an RRC connection setup procedure.

In some embodiments, the transmission of the number of flight path points of the unmanned aerial vehicle may be implemented in multiple RRC-related procedures, and the base station may obtain the number of flight path points of the unmanned aerial vehicle in time. In addition, in some embodiments, existing RRC procedures may be reused, without adding an additional uplink message or without allocating resources by the base station to the additional uplink message. Therefore, a report procedure may be simplified and a good compatibility with an existing mobile communication system may be provided.

In some embodiments, in the RRC connection reconfiguration procedure, the RRC signaling may include an RRC connection reconfiguration completion signaling.

In the RRC connection reconstruction procedure, the RRC signaling may include an RRC connection reestablishment completion signaling.

In the RRC connection resume procedure, the RRC signaling may include an RRC connection resume completion signaling.

In the RRC connection setup procedure, the RRC signaling may include an RRC connection setup completion signaling.

Multiple pieces of RRC signaling may be used in each RRC processing procedure, which may be used to transmit the number of flight path points of the unmanned aerial vehicle. In some embodiments, a last piece of signaling of each RRC processing procedure may be used. That is, a completion signaling of each RRC processing procedure is used, thereby reducing an impact on each RRC processing procedure, and providing a good compatibility.

In some embodiments, the method may further include steps B1-B2.

At step B1, a user equipment information request signaling may be sent to the unmanned aerial vehicle. The user equipment information request signaling may carry the maximum number of flight path points to be reported.

At step B2, a user equipment information response signaling sent by the unmanned aerial vehicle may be received. The user equipment information response signaling may carry information of flight path points of the unmanned aerial vehicle that are not more than the maximum number of flight path points to be reported.

In some embodiments, the base station may send the user equipment information request signaling to the unmanned aerial vehicle at any time after receiving the number of flight path points of the unmanned aerial vehicle, to request to obtain the information of flight path points of the unmanned aerial vehicle.

The base station may determine the maximum number of flight path points based on factors, such as the received number of flight path points of the unmanned aerial vehicle and a current network environment. Cells may be well assigned to the unmanned aerial vehicle based on the information of flight path points of the unmanned aerial vehicle after the user equipment information response signaling sent by the unmanned aerial vehicle is received.

In some embodiments, an information unit of a flight path information request in the user equipment information request signaling may carry the maximum number of flight path points. An information unit of a flight path information report in the user equipment information response signaling may carry the information of flight path points of the unmanned aerial vehicle.

In some embodiments, a feasible solution may be provided by using the information unit of the flight path information request in the user equipment information request signaling to carry the maximum number of flight path points, and using the information unit of the flight path information report in the user equipment information response signaling to carry the information of flight path points of the unmanned aerial vehicle.

Implementations of embodiments of the disclosure may be described in detail below.

Figure 4:
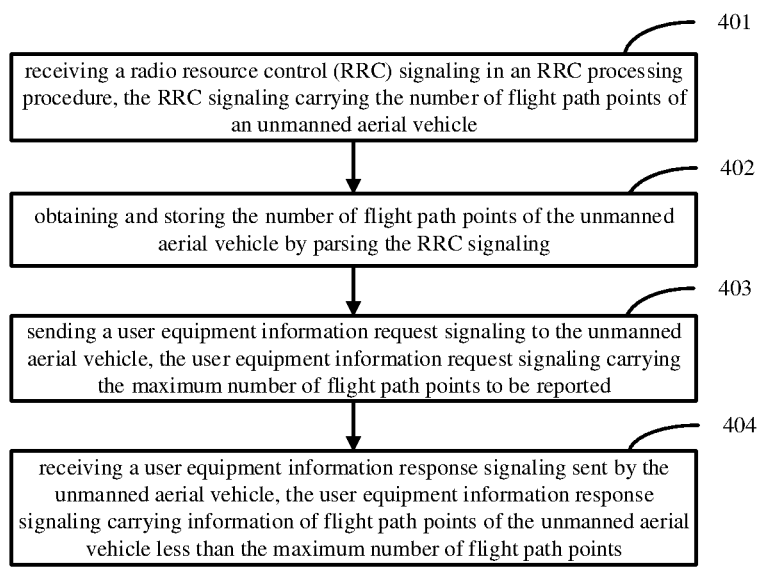
FIG. 4 is a flowchart illustrating a method for transmitting flight information according to an exemplary embodiment.

FIG. 4 is a flowchart illustrating a method for transmitting flight information according to an exemplary embodiment. The method for transmitting the flight information is applicable to access network equipment such as a base station. As illustrated in FIG. 4, the method may include steps 401-404

At step 401, an RRC signaling may be received in an RRC processing procedure. The RRC signaling may carry the number of flight path points of the unmanned aerial vehicle.

At step 402, the number of flight path points of an unmanned aerial vehicle may be obtained and stored by parsing the RRC signaling.

At step 403, a user equipment information request signaling may be sent to the unmanned aerial vehicle. The user equipment information request signaling may carry the maximum number of flight path points to be reported.

At step 404, a user equipment information response signaling sent by the unmanned aerial vehicle may be received. The user equipment information response signaling may carry information of flight path points of the unmanned aerial vehicle that are not more than the maximum number of flight path points to be reported.

Implementations will be described with reference to the unmanned aerial vehicle and the base station.

Figure 5:
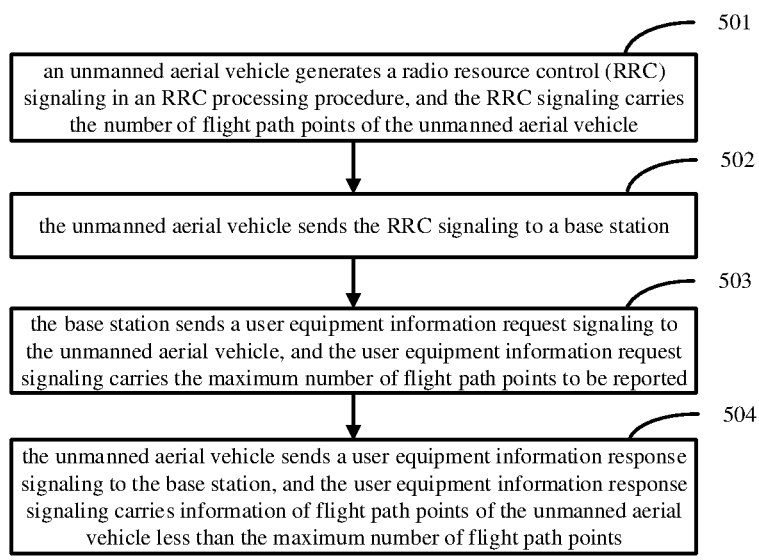
FIG. 5 is a flowchart illustrating a method for transmitting flight information according to an exemplary embodiment.

FIG. 5 is a flowchart illustrating a method for transmitting flight information according to an exemplary embodiment. As illustrated in FIG. 5, the method may include steps 501-504.

At step 501, the unmanned aerial vehicle may generate an RRC signaling in an RRC processing procedure. The RRC signaling may carry the number of flight path points of the unmanned aerial vehicle.

At step 502, the unmanned aerial vehicle may send the RRC signaling to the base station.

At step 503, the base station may send a user equipment information request signaling to the unmanned aerial vehicle. The UE information request signaling may carry the maximum number of flight path points to be reported.

At step 504, the unmanned aerial vehicle may send a user equipment information response signaling to the base station. The user equipment information response signaling may carry information of flight path points of the unmanned aerial vehicle that are not more than the maximum number of flight path points.

A procedure for transmitting user equipment information may be independent of the RRC processing procedure. Descriptions will be made below to a procedure for transmitting the user equipment information.

Figure 6:
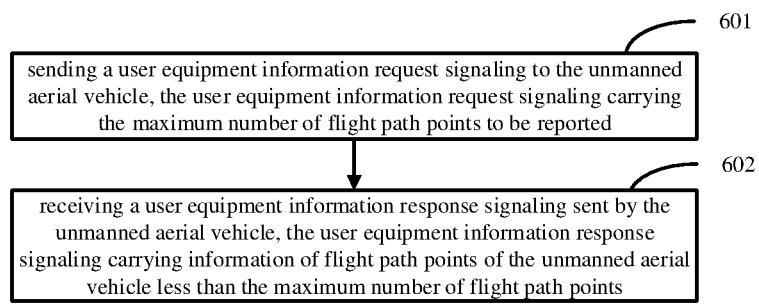
FIG. 6 is a flowchart illustrating a method for transmitting flight information according to an exemplary embodiment.

FIG. 6 is a flowchart illustrating a method for transmitting flight information according to an exemplary embodiment. The method for transmitting the flight information is applicable to access network equipment such as a base station. As illustrated in FIG. 6, the method may include steps 601-602.

At step 601, a user equipment information request signaling may be sent to an unmanned aerial vehicle. The user equipment information request signaling may carry the maximum number of flight path points to be reported.

At step 602, a user equipment information response signaling sent by the unmanned aerial vehicle may be received. The user equipment information response signaling may carry information of flight path points of the unmanned aerial vehicle that are not more than the maximum number of flight path points to be reported.

In some embodiments, the base station may send the user equipment information request signaling to the unmanned aerial vehicle whenever needed, thereby requesting to obtain information of flight path points of the unmanned aerial vehicle.

The base station may determine the maximum number of flight path points based on factors such as a current network environment. Cells may be well assigned to the unmanned aerial vehicle based on the received information of the flight path points of the unmanned aerial vehicle after the user equipment information response signaling sent by the unmanned aerial vehicle is received.

Figure 7:
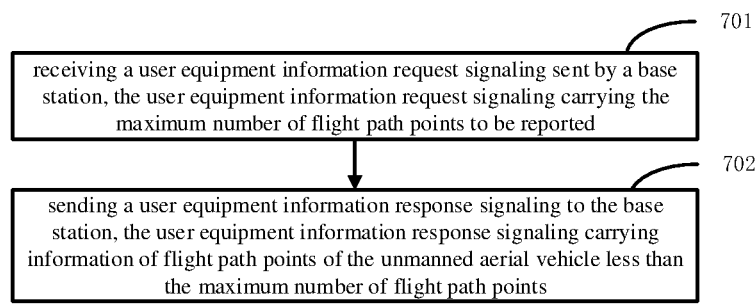
FIG. 7 is a flowchart illustrating a method for transmitting flight information according to an exemplary embodiment.

FIG. 7 is a flowchart illustrating a method for transmitting flight information according to an exemplary embodiment. The method for transmitting the flight information is applicable to a mobile device such as an unmanned aerial vehicle. As illustrated in FIG. 7, the method may include steps 701-702

At step 701, a user equipment information request signaling sent by a base station may be received. The user equipment information request signaling may carry the maximum number of flight path points to be reported.

At step 702, a user equipment information response signaling may be sent to the base station. The user equipment information response signaling may carry information of flight path points of the unmanned aerial vehicle that are not more than the maximum number of flight path points to be reported.

In some embodiments, a way and a feasible solution may be provided to allow the unmanned aerial vehicle to report information of flight path points of the unmanned aerial vehicle to the base station. The unmanned aerial vehicle may report the information of flight path points of the unmanned aerial vehicle based on uplink resources allocated by the base station.

The base station may notify the unmanned aerial vehicle of the maximum number of flight path points to be reported through the user equipment information request signaling. The maximum number of flight path points to be reported may indicated the maximum amount of uplink resources allocated by the base station to the unmanned aerial vehicle for reporting the information of flight path points of the unmanned aerial vehicle. The user equipment information request signaling may also include indication information of the maximum amount of uplink resources for reporting the information of flight path points of the unmanned aerial vehicle.

The unmanned aerial vehicle may report the information of flight path points of the unmanned aerial vehicle based on the received the maximum number of flight path points to be reported. The information of flight path points of the unmanned aerial vehicle is information of flight path points that the unmanned aerial vehicle will pass through. The number of flight path points contained in the information of flight path points of the unmanned aerial vehicle may be not greater than the received maximum number of flight path points to e reported.

The above embodiments may be flexibly combined based on an actual requirement.

The below is apparatus embodiments of the disclosure, which may be configured to execute the method embodiments of the disclosure.

Figure 8:
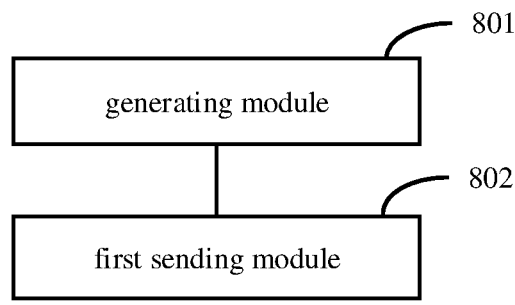
FIG. 8 is a block diagram illustrating an apparatus for transmitting flight information according to an exemplary embodiment.

FIG. 8 is a block diagram illustrating an apparatus for transmitting flight information according to an exemplary embodiment. The apparatus may be implemented as a part or all of an electronic device in the form of software, hardware or a combination thereof, and applied to an unmanned aerial vehicle side. Referring to FIG. 8, the apparatus for transmitting the flight information includes a generating module 801 and a first sending module 802.

The generating module 801 is configured to generate a radio resource control (RRC) signaling in an RRC processing procedure. The RRC signaling carries the number of flight path points of the unmanned aerial vehicle.

The first sending module 802 is configured to send the RRC signaling to a base station.

In an embodiment, the RRC processing procedure includes at least one of: an RRC connection reconfiguration procedure, an RRC connection reestablishment procedure, an RRC connection resume procedure and an RRC connection setup procedure.

In an embodiment, in the RRC connection reconfiguration procedure, the RRC signaling includes an RRC connection reconfiguration completion signaling.

In the RRC connection reestablishment procedure, the RRC signaling includes an RRC connection reestablishment completion signaling.

In the RRC connection resume procedure, the RRC signaling includes an RRC connection resume completion signaling.

In the RRC connection setup procedure, the RRC signaling includes an RRC connection setup completion signaling.

Figure 9:
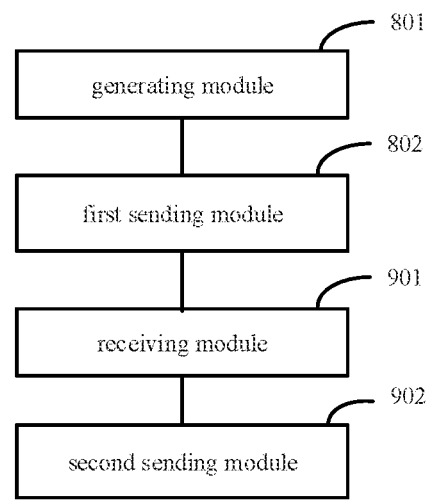
FIG. 9 is a block diagram illustrating an apparatus for transmitting flight information according to an exemplary embodiment.

In an embodiment, as illustrated in FIG. 9, the apparatus also includes: a receiving module 901 and a second sending module 902.

The receiving module 902 is configured to receive a user equipment information request signaling sent by the base station. The user equipment information request signaling carries the maximum number of flight path points to be reported.

The second sending module 902 is configured to send a user equipment information response signaling to the base station. The user equipment information response signaling carries information of flight path points of the unmanned aerial vehicle that are not more than the maximum number of flight path points.

In an embodiment, an information unit of a flight path information request in the user equipment information request signaling carries the maximum number of flight path points; and an information unit of a flight path information report in the user equipment information response signaling carries the information of flight path points of the unmanned aerial vehicle.

Figure 10:
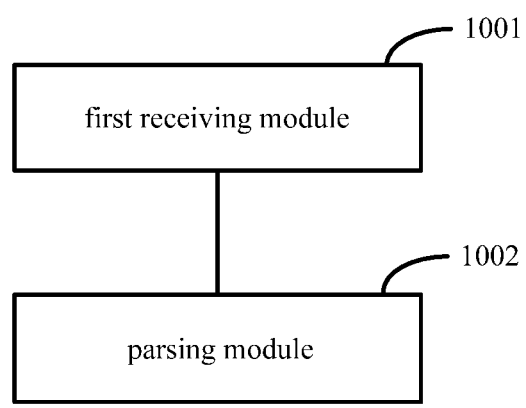
FIG. 10 is a block diagram illustrating an apparatus for transmitting flight information according to an exemplary embodiment.

FIG. 10 is a block diagram illustrating an apparatus for transmitting flight information according to an exemplary embodiment. The apparatus may be implemented as a part or all of an electronic device in the form of software, hardware or a combination thereof, and applied to a base station side. Referring to FIG. 10, the apparatus for transmitting the flight information includes a first receiving module 1001 and a parsing module 1002.

The first receiving module 1001 is configured to receive a radio resource control (RRC) signaling in an RRC processing procedure. The RRC signaling carries the number of flight path points of an unmanned aerial vehicle.

The parsing module 1002 is configured to obtain and store the number of flight path points of the unmanned aerial vehicle by parsing the RRC signaling. In an embodiment, the RRC processing procedure includes at least one of: an RRC connection reconfiguration procedure, an RRC connection reestablishment procedure, an RRC connection resume procedure and an RRC connection setup procedure.

In an embodiment, in the RRC connection reconfiguration procedure, the RRC signaling includes an RRC connection reconfiguration completion signaling. In the RRC connection reestablishment procedure, the RRC signaling includes an RRC connection reestablishment completion signaling. In the RRC connection resume procedure, the RRC signaling includes an RRC connection resume completion signaling. In the RRC connection setup procedure, the RRC signaling includes an RRC connection setup completion signaling.

Figure 11:
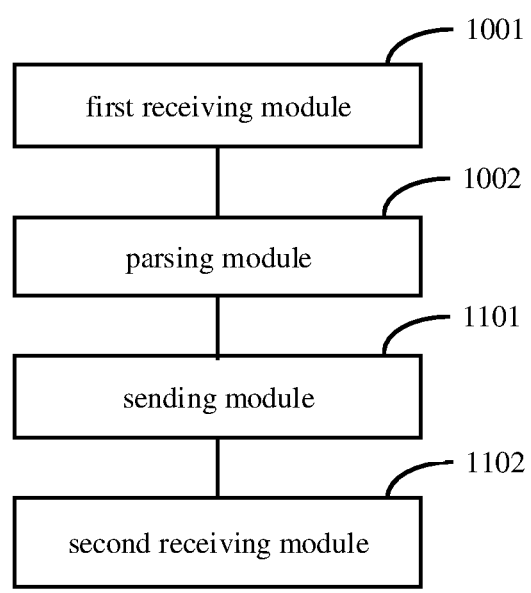
FIG. 11 is a block diagram illustrating an apparatus for transmitting flight information according to an exemplary embodiment.

In an embodiment, as illustrated in FIG. 11, the apparatus also includes: a sending module 1101 and a second receiving module 1102.

The sending module 1101 is configured to send a user equipment information request signaling to the unmanned aerial vehicle. The user equipment information request signaling carries the maximum number of flight path points to be reported.

The second receiving module 1102 is configured to receive a user equipment information response signaling sent by the unmanned aerial vehicle. The user equipment information response signaling carries information of flight path points of the unmanned aerial vehicle that are not more than the maximum number of flight path points.

In an embodiment, an information unit of a flight path information request in the user equipment information request signaling carries the maximum number of flight path points; and an information unit of a flight path information report in the user equipment information response signaling carries the information of flight path points of the unmanned aerial vehicle.

Figure 12:
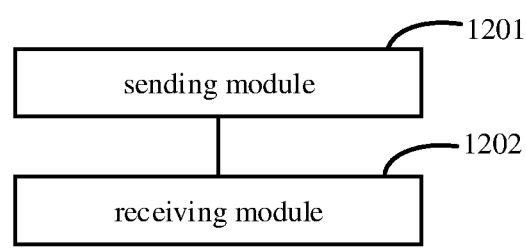
FIG. 12 is a block diagram illustrating an apparatus for transmitting flight information according to an exemplary embodiment.

FIG. 12 is a block diagram illustrating an apparatus for transmitting flight information according to an exemplary embodiment. The apparatus may be implemented as a part or all of an electronic device in the form of software, hardware or a combination thereof, and applied to a base station side. Referring to FIG. 12, the apparatus for transmitting the flight information includes a sending module 1201 and a receiving module 1402.

The sending module 1201 is configured to send a user equipment information request signaling to an unmanned aerial vehicle. The user equipment information request signaling carries the maximum number of flight path points to be reported.

The receiving module 1202 is configured to receive a user equipment information response signaling sent by the unmanned aerial vehicle. The user equipment information response signaling carries information of flight path points of the unmanned aerial vehicle that are not more than the maximum number of flight path points.

Figure 13:
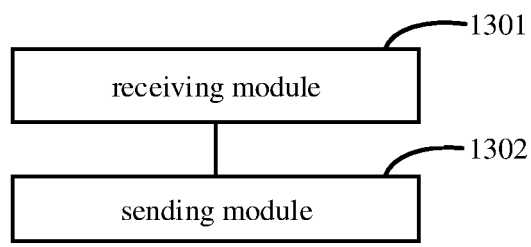
FIG. 13 is a block diagram illustrating an apparatus for transmitting flight information according to an exemplary embodiment.

FIG. 13 is a block diagram illustrating an apparatus for transmitting flight information according to an exemplary embodiment. The apparatus may be implemented as a part or all of an electronic device in the form of software, hardware or a combination thereof, and applied to an unmanned aerial vehicle side. Referring to FIG. 13, the apparatus for transmitting the flight information includes a receiving module 1301 and a sending module 1302.

The receiving module 1301 is configured to receive a user equipment information request signaling sent by a base station. The user equipment information request signaling carries the maximum number of flight path points to be reported.

The sending module 1302 is configured to send a user equipment information response signaling to the base station. The user equipment information response signaling carries information of flight path points of the unmanned aerial vehicle that are not more than the maximum number of flight path points.

With respect to the apparatuses in the above embodiments, a detailed manner in which each module performs operation has been described in detail in the method embodiment, which is not elaborated herein.

Figure 14:
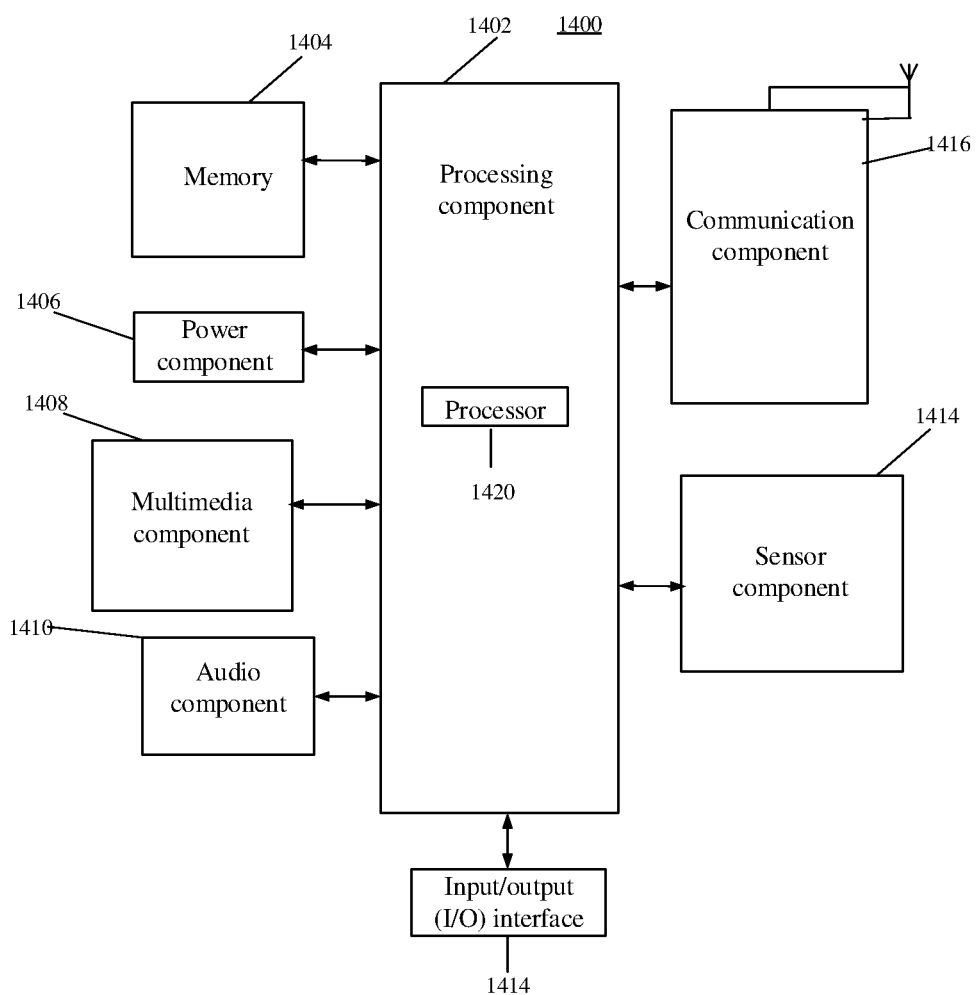
FIG. 14 is a block diagram illustrating a device for transmitting flight information according to an exemplary embodiment.

FIG. 14 is a block diagram illustrating a device for transmitting flight information according to an exemplary embodiment. For example, the device 1400 may be a mobile phone, a computer, a digital broadcasting terminal, a message sending and receiving equipment, a game controller, a tablet device, a medical device, a fitness equipment, a personal digital assistant or the like.

The device 1400 may include one or more of: a processing component 1402, a memory 1404, a power component 1406, a multimedia component 1408, an audio component 1410, an input/output (I/O) interface 1414, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1402 to execute instructions to perform all or part of the steps in the above described methods. Moreover, the processing component 1402 may include one or more modules which facilitate the interaction between the processing component 1402 and other components. For example, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400 for performing the directional operation, contraction data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 is configured to provide power to various components of the device 1400. The power component 1406 may include a power management system, one or more power sources, and any other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the device 1400 is in an operation mode, such as an adjustment mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") for receiving an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1414 is configured to provide an interface between the processing component 1402 and peripheral interface modules, such as a keyboard, a click wheel, buttons, and the like. The buttons may include, but be not limited to, a home button, a volume button, a starting button, and a locking button.

The sensor component 1414 includes one or more sensors for providing status assessments of various aspects of the device 1400. For example, the sensor component 1414 may detect an open/closed status of the device 1400, relative positioning of components, e.g., the display and the keypad of the device 1400, a change in position of the device 1400 or a component of the device 1400, a presence or absence of user contraction with the device 1400, an orientation or an acceleration/deceleration of the device 1400, and a change in temperature of the device 1400. The sensor component 1414 may include a proximity sensor for detecting the presence of nearby objects without any physical contact. The sensor component 1414 may also include a light sensor, such as a CMOS (complementary metal-oxide-semiconductor)) or a CCD (charge coupled device) image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 may access a wireless network based on a communication standard, such as Wi-Fi, 2 G, or 3 G, or a combination thereof. In one exemplary embodiment, the communication component 1416 receives a broadcast signal or broadcast associated information from an external broadcast management system via a broadcast channel. In an exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer readable storage medium including instructions, such as the memory 1404 including the instructions. The instructions may be executed by the processor 1420 in the device 1400 for performing the above method. For example, the non-transitory computer readable storage medium may be a ROM, a RAM, a CD-ROM, a magnetic tape, a floppy disc, an optical data storage device, and the like.

In an exemplary embodiment, there is provided a device for transmitting flight information. The device includes a processor and a memory. The memory is configured to store instructions executable by the processor. The processor is configured to: generate a radio resource control (RRC) signaling in an RRC processing procedure, the RRC signaling carrying the number of flight path points of an unmanned aerial vehicle; and send the RRC signaling to a base station.

The processor is also configured to execute: the RRC processing procedure including at least one of: an RRC connection reconfiguration procedure, an RRC connection reestablishment procedure, an RRC connection resume procedure and an RRC connection setup procedure.

In the RRC connection reconfiguration procedure, the RRC signaling includes an RRC connection reconfiguration completion signaling. In the RRC connection reestablishment procedure, the RRC signaling includes an RRC connection reestablishment completion signaling. In the RRC connection resume procedure, the RRC signaling includes an RRC connection resume completion signaling. In the RRC connection setup procedure, the RRC signaling includes an RRC connection setup completion signaling.

The processor is also configured to: receive a user equipment information request signaling sent by the base station, the user equipment information request signaling carrying the maximum number of flight path points to be reported; and send a user equipment information response signaling to the base station, the user equipment information response signaling carrying information of flight path points of the unmanned aerial vehicle that are not more than the maximum number of flight path points.

An information unit of a flight path information request in the user equipment information request signaling carries the maximum number of flight path points. An information unit of a flight path information report in the user equipment information response signaling carries the information of flight path points of the unmanned aerial vehicle.

There is provided a computer readable storage medium. Instructions in the computer readable storage medium are configured to cause a device to execute the above method for transmitting the flight information when executed by the processor in the device. The method includes: generating a radio resource control (RRC) signaling in an RRC processing procedure, the RRC signaling carrying the number of flight path points of the unmanned aerial vehicle; and sending the RRC signaling to a base station.

The instructions in the computer readable storage medium are configured to execute: the RRC processing procedure including at least one of: an RRC connection reconfiguration procedure, an RRC connection reestablishment procedure, an RRC connection resume procedure and an RRC connection setup procedure.

In the RRC connection reconfiguration procedure, the RRC signaling includes an RRC connection reconfiguration completion signaling. In the RRC connection reestablishment procedure, the RRC signaling includes an RRC connection reestablishment completion signaling. In the RRC connection resume procedure, the RRC signaling includes an RRC connection resume completion signaling. In the RRC connection setup procedure, the RRC signaling includes an RRC connection setup completion signaling.

The instructions in the computer readable storage medium are configured to: receive a user equipment information request signaling sent by the base station, the user equipment information request signaling carrying the maximum number of flight path points to be reported; and send a user equipment information response signaling to the base station, the user equipment information response signaling carrying information of flight path points of the unmanned aerial vehicle that are not more than the maximum number of flight path points.

An information unit of a flight path information request in the user equipment information request signaling carries the maximum number of flight path points. An information unit of a flight path information report in the user equipment information response signaling carries information of flight path points of the unmanned aerial vehicle.

In an exemplary embodiment, there is provided a device for transmitting flight information. The device includes: a processor and a memory. The memory is configured to store instructions executable by the processor. The processor is configured to: receive a user equipment information request signaling sent by the base station, the user equipment information request signaling carrying the maximum number of flight path points to be reported; and send a user equipment information response signaling to the base station, the user equipment information response signaling carrying information of flight path points of the unmanned aerial vehicle that are not more than the maximum number of flight path points.

There is provided a computer readable storage medium. Instructions in the computer readable storage medium are configured to cause a device to execute the above method for transmitting the flight information when executed by the processor in the device. The method includes: receiving a user equipment information request signaling sent by the base station, the user equipment information request signaling carrying the maximum number of flight path points to be reported; and sending a user equipment information response signaling to the base station, the user equipment information response signaling carrying the information of flight path points of the unmanned aerial vehicle that are not more than the maximum number of flight path points.

Figure 15:
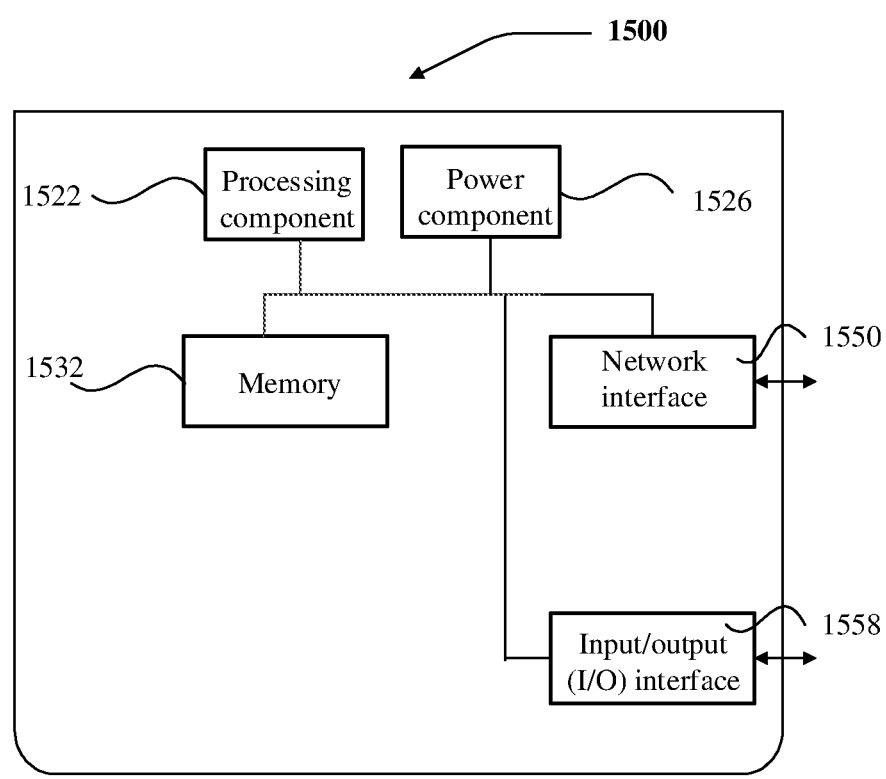
FIG. 15 is a block diagram illustrating a device for transmitting flight information according to an exemplary embodiment.

FIG. 15 is a block diagram illustrating a device 1500 for synchronizing data according to an exemplary embodiment. For example, the device 1500 may be provided as a computer. Referring to FIG. 15, the device 1500 includes a processing component 1522, which further includes one or more processors, and a memory resource represented by a memory 1532 for storing instructions executable by the processing component 1522, such as an application. The application stored in the memory 1532 may include one or more modules each corresponding to a set of instructions. In addition, the processing component 1522 is configured to execute instructions to perform the method for synchronizing data.

The device 1500 may also include a power component 1526 configured to perform power management of the device 1500, a wired or wireless network interface 1550 configured to connect the device 1500 to a network, and an input output (I/O) interface 1558. The device 1500 may operate an operating system stored in the memory 1532, such as Windows ServerTM, Mac OS XTM, UnixTM, LinuxTM, FreeBSDTM or the like.

In an exemplary embodiment, there is provided a device for transmitting flight information. The device includes: a processor and a memory. The memory is configured to store instructions executable by the processor. The processor is configured to: receive a radio resource control (RRC) signaling in an RRC processing procedure, the RRC signaling carrying the number of flight path points of an unmanned aerial vehicle; and obtain and store the number of flight path points of the unmanned aerial vehicle by parsing the RRC signaling.

The processor may also be configured to execute: the RRC processing procedure including at least one of: an RRC connection reconfiguration procedure, an RRC connection reestablishment procedure, an RRC connection resume procedure and an RRC connection setup procedure.

In the RRC connection reconfiguration procedure, the RRC signaling includes an RRC connection reconfiguration completion signaling. In the RRC connection reestablishment procedure, the RRC signaling includes an RRC connection reestablishment completion signaling. In the RRC connection resume procedure, the RRC signaling includes an RRC connection resume completion signaling. In the RRC connection setup procedure, the RRC signaling includes an RRC connection setup completion signaling.

The processor may also be configured to: sending a user equipment information request signaling to the unmanned aerial vehicle, the user equipment information request signaling carrying the maximum number of flight path points to be reported; and receiving a user equipment information response signaling sent by the unmanned aerial vehicle, the user equipment information response signaling carrying information of flight path points of the unmanned aerial vehicle that are not more than the maximum number of flight path points.

An information unit of a flight path information request in the user equipment information request signaling carries the maximum number of flight path points. An information unit of a flight path information report in the user equipment information response signaling carries the information of flight path points of the unmanned aerial vehicle.

There is provided a computer readable storage medium. Instructions in the computer readable storage medium are configured to cause a device to execute the above method for transmitting the flight information when executed by the processor in the device. The method includes: receiving a radio resource control (RRC) signaling in an RRC processing procedure, the RRC signaling carrying the number of flight path points of an unmanned aerial vehicle; and obtaining and storing the number of flight path points of the unmanned aerial vehicle by parsing the RRC signaling.

The instructions in the computer readable storage medium are configured to execute: the RRC processing procedure including at least one of: an RRC connection reconfiguration procedure, an RRC connection reestablishment procedure, an RRC connection resume procedure and an RRC connection setup procedure.

In the RRC connection reconfiguration procedure, the RRC signaling includes an RRC connection reconfiguration completion signaling. In the RRC connection reestablishment procedure, the RRC signaling includes an RRC connection reestablishment completion signaling. In the RRC connection resume procedure, the RRC signaling includes an RRC connection resume completion signaling. In the RRC connection setup procedure, the RRC signaling includes an RRC connection setup completion signaling.

The instructions in the computer readable storage medium are configured to: sending a user equipment information request signaling to the unmanned aerial vehicle, the user equipment information request signaling carrying the maximum number of flight path points to be reported; and receiving a user equipment information response signaling sent by the unmanned aerial vehicle, the user equipment information response signaling carrying information of flight path points of the unmanned aerial vehicle that are not more than the maximum number of flight path points.

An information unit of a flight path information request in the user equipment information request signaling carries the maximum number of flight path points. An information unit of a flight path information report in the user equipment information response signaling carries the information of flight path points of the unmanned aerial vehicle.

In an exemplary embodiment, there is provided a device for transmitting flight information. The device includes: a processor and a memory. The memory is configured to store instructions executable by the processor. The processor is configured to:

In an exemplary embodiment, there is provided a device for transmitting flight information. The device includes: a processor and a memory. The memory is configured to store instructions executable by the processor. The processor is configured to: send a user equipment information request signaling to an unmanned aerial vehicle, the user equipment information request signaling carrying the maximum number of flight path points to be reported; and receive a user equipment information response signaling sent by the unmanned aerial vehicle, the user equipment information response signaling carrying information of flight path points of the unmanned aerial vehicle that are not more than the maximum number of flight path points.

There is provided a computer readable storage medium. Instructions in the computer readable storage medium are configured to cause a device to execute the above method for transmitting the flight information when executed by the processor in the device. The method includes: sending a user equipment information request signaling to an unmanned aerial vehicle, the user equipment information request signaling carrying the maximum number of flight path points to be reported; and receiving a user equipment information response signaling sent by the unmanned aerial vehicle, the user equipment information response signaling carrying information of flight path points of the unmanned aerial vehicle that are not more than the maximum number of flight path points.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various modifications and changes may be made without departing from the scope thereof. The scope of the disclosure only be limited by the appended claims.

What is claimed is:

1. A method for transmitting flight information, applied to an unmanned aerial vehicle, the method comprising:
    generating a radio resource control (RRC) signaling in an RRC processing procedure, the RRC signaling carrying a number of flight path points of the unmanned aerial vehicle;
    sending the RRC signaling to a base station;
    receiving a user equipment information request signaling sent by the base station, the user equipment information request signaling carrying a maximum number of flight path points to be reported; and
    sending a user equipment information response signaling to the base station, the user equipment information response signaling carrying information of the flight path points of the unmanned aerial vehicle, the flight path points of the unmanned aerial vehicle being not more than the maximum number of flight path points.

2. The method of claim 1, wherein the RRC processing procedure comprises at least one of: an RRC connection reconfiguration procedure, an RRC connection reestablishment procedure, an RRC connection resume procedure and an RRC connection setup procedure.

3. The method of claim 2, wherein in the RRC connection reconfiguration procedure, the RRC signaling comprises an RRC connection reconfiguration completion signaling;
    in the RRC connection reestablishment procedure, the RRC signaling comprises an RRC connection reestablishment completion signaling;
    in the RRC connection resume procedure, the RRC signaling comprises an RRC connection resume completion signaling; and
    in the RRC connection setup procedure, the RRC signaling comprises an RRC connection setup completion signaling.

4. The method of claim 1, wherein an information unit of a flight path information request in the user equipment information request signaling carries the maximum number of flight path points; and
    an information unit of a flight path information report in the user equipment information response signaling carries the information of the flight path points of the unmanned aerial vehicle.

5. A method for transmitting flight information, applied to a base station, the method comprising:
    receiving a radio resource control (RRC) signaling in an RRC processing procedure, the RRC signaling carrying a number of flight path points of an unmanned aerial vehicle;
    obtaining and storing the number of flight path points of the unmanned aerial vehicle by parsing the RRC signaling;
    sending a user equipment information request signaling to the unmanned aerial vehicle, the user equipment information request signaling carrying a maximum number of flight path points to be reported; and
    receiving a user equipment information response signaling sent by the unmanned aerial vehicle, the user equipment information response signaling carrying information of the flight path points of the unmanned aerial vehicle, the flight path points of the unmanned aerial vehicle being not more than the maximum number of flight path points.

6. The method of claim 5, wherein the RRC processing procedure comprises at least one of: an RRC connection reconfiguration procedure, an RRC connection reestablishment procedure, an RRC connection resume procedure and an RRC connection setup procedure.

7. The method of claim 6, wherein in the RRC connection reconfiguration procedure, the RRC signaling comprises an RRC connection reconfiguration completion signaling;
    in the RRC connection reestablishment procedure, the RRC signaling comprises an RRC connection reestablishment completion signaling;
    in the RRC connection resume procedure, the RRC signaling comprises an RRC connection resume completion signaling; and
    in the RRC connection setup procedure, the RRC signaling comprises an RRC connection setup completion signaling.

8. The method of claim 5, wherein an information unit of a flight path information request in the user equipment information request signaling carries the maximum number of flight path points; and
    an information unit of a flight path information report in the user equipment information response signaling carries the information of the flight path points of the unmanned aerial vehicle.

9. A device for transmitting flight information, comprising:
    a processor; and
    a memory configured to store instructions executable by the processor,
    wherein the processor is configured to:
    generate a radio resource control (RRC) signaling in an RRC processing procedure, the RRC signaling carrying a number of flight path points of an unmanned aerial vehicle;
    send the RRC signaling to a base station;
    receive a user equipment information request signaling sent by the base station, the user equipment information request signaling carrying a maximum number of flight path points to be reported; and
    send a user equipment information response signaling to the base station, the user equipment information response signaling carrying information of the flight path points of the unmanned aerial vehicle, the flight path points of the unmanned aerial vehicle being not more than the maximum number of flight path points.

10. The device of claim 9, wherein the RRC processing procedure comprises at least one of: an RRC connection reconfiguration procedure, an RRC connection reestablishment procedure, an RRC connection resume procedure and an RRC connection setup procedure.

11. The device of claim 10, wherein in the RRC connection reconfiguration procedure, the RRC signaling comprises an RRC connection reconfiguration completion signaling;
- in the RRC connection reestablishment procedure, the RRC signaling comprises an RRC connection reestablishment completion signaling;
- in the RRC connection resume procedure, the RRC signaling comprises an RRC connection resume completion signaling; and
- in the RRC connection setup procedure, the RRC signaling comprises an RRC connection setup completion signaling.

12. The device of claim 9, wherein an information unit of a flight path information request in the user equipment information request signaling carries the maximum number of flight path points; and
- an information unit of a flight path information report in the user equipment information response signaling carries the information of the flight path points of the unmanned aerial vehicle.

* * * * *